US007050084B1

(12) United States Patent
Lang

(10) Patent No.: US 7,050,084 B1
(45) Date of Patent: May 23, 2006

(54) CAMERA FRAME DISPLAY

(75) Inventor: Andrew W. Lang, Sydney (AU)

(73) Assignee: Avaya Technology Corp., Basking Ridge, NJ (US)

( * ) Notice: Subject to any disclaimer, the term of this patent is extended or adjusted under 35 U.S.C. 154(b) by 4 days.

(21) Appl. No.: 10/949,781

(22) Filed: Sep. 24, 2004

(51) Int. Cl.
*H04N 7/14* (2006.01)

(52) U.S. Cl. .............................. 348/14.16; 348/14.05; 348/207

(58) Field of Classification Search .. 348/14.01–14.16, 348/207.99, 208.14, 208.15, 208.16, 333.03, 348/333.04; 359/618; 396/431
See application file for complete search history.

(56) References Cited

U.S. PATENT DOCUMENTS

| | | | |
|---|---|---|---|
| 4,791,660 A | 12/1988 | Oye et al. ...................... 379/88 |
| 5,164,992 A | 11/1992 | Turk et al. ...................... 382/2 |
| 5,430,473 A * | 7/1995 | Beecher et al. .......... 348/14.05 |
| 5,506,872 A | 4/1996 | Mohler ........................ 375/240 |
| 5,619,254 A * | 4/1997 | McNelley ................. 348/14.16 |
| 5,675,376 A | 10/1997 | Andersson et al. ........... 348/20 |
| RE36,041 E | 1/1999 | Turk et al. .................. 382/118 |
| 5,986,703 A | 11/1999 | O'Mahony .................. 348/333 |
| 6,046,767 A * | 4/2000 | Smith ....................... 348/14.16 |
| 6,463,220 B1 * | 10/2002 | Dance et al. ................ 396/431 |
| 6,498,684 B1 * | 12/2002 | Gladnick et al. ........... 359/618 |
| 6,507,356 B1 | 1/2003 | Jackel et al. ............. 348/14.06 |
| 6,753,900 B1 | 6/2004 | Runcie et al. ........... 348/14.16 |
| 6,878,924 B1 * | 4/2005 | Baron ....................... 348/14.08 |
| 2002/0061131 A1 | 5/2002 | Sawhney et al. ........... 382/154 |
| 2002/0113862 A1 | 8/2002 | Center, Jr. et al. ....... 348/14.08 |

FOREIGN PATENT DOCUMENTS

| | | | |
|---|---|---|---|
| EP | 0 118 182 | | 9/1985 |
| FR | 2529352 A | * | 12/1983 |
| JP | 401221086 A | | 9/1989 |
| JP | 404344788 A | | 12/1992 |
| JP | 05219269 A | * | 8/1993 |

OTHER PUBLICATIONS

U.S. Appl. No. 10/459,182, filed Jun. 10, 2003, Chan et al.
Fintzel et al., "Real Time 3D Navigation in a Static Virtualzied Scene from a Limited Set of 2D Data," 11 pages, IEEE Int'l Conf. on Multimedia & Expo 2000, New York, Electronic Proceedings, 2000.
Mark et al., "Post-Rendering 3D Warping", *In Proceedings of 1997 Symposium on Interactive 3D Graphics*, Providence, RI, Apr. 27-30, 1997, pp. 7-16.

(Continued)

*Primary Examiner*—Wing Chan
(74) *Attorney, Agent, or Firm*—Sheridan Ross PC

(57) ABSTRACT

The present invention is directed to a video telephony system, comprising:
(a) an imaging device 116 to receive an image of a first participant 104 in a communication interaction with a second participant 120 remote from the first participant;
(b) an audio input device 108 to receive the first participant's voice communication with the second participant; and
(c) a processor 136 operable to forward the received image and voice communication, respectively, to a display and audio output device associated with the second participant. The imaging device 116 comprises at least one boundary marking device to project, during the communication session, at least one boundary marker 154 visible to the first participant 104. The boundary marker 154 indicates a spatial extent of at least one of the received image and an image circle of the imaging device.

30 Claims, 6 Drawing Sheets

OTHER PUBLICATIONS http://www-cs.ccny.cuny.edu/~walberg/diw.html, Mar. 4, 2002, 7 pages, Preface and Table of Contents for Wolberg,"Digital Image Warping," IEEE Computer Society Press Monograph.

Soongsathitanon, et al., "A New Orthogonal Logarithmic Search Algorithm for Fixed Block-Based Motion Estimation for Video Coding," date unknown.

Marpe, et al., "Video Compression Using Context-Based Adaptive Arithmetic Coding," Proc. IEEE International Conference on Image Processing (ICIP'01), vol. III, pp. 558-561, Oct. 2001.

Brandstein, Michael, "Real-Time Face Tracking Using Audio and Image Data," Harvard Intelligent Multi-Media Environment Laboratory (HIMMEL) (undated), pp. 1-22.

Eisert, Peter, "Immersive 3-D Vidoe Conferencing: Challenges, Concepts, and Implementations," Proc. SPIE Visual Communications and Image Processing (VCIP), Lagano, Switzerland (Jul. 2003), 11 pages.

Imagis Technologies Inc. News Release, "Imagis Technologies Releases Major Upgrade to Face Recognition Software," (Sep. 2002).

Entropy Software Laboratory, "Image Recognition" (undated), available at http://www.entropysoftwarelab.com/technology/imageRecognition.html, 3 pages.

Sanyo Electric Co., Ltd., "Character and Image Recognition Technology," Technology R&D Headquarters (2003), available at http://www.sanyo.co.ip/R_and_D/english/theme/c-2.html, 2 pages.

Toshiba Corporation Press Release, "Toshiba Announces World's First Image Recognition LSI for Intelligent Vehicle System," (Feb. 6, 2001), available at http://www.toshiba.co.Ip/about/press/2001_02/pr0602.htm, 3 pages.

Jun, Song F. et al., Optical Feature Recognition, (Mar. 6, 1995), 1 page.

Peter Kauff Projects, "BS-Immersive Media & 3D Video Group," (Ed. Christoph Fehn, Nov. 12, 2002), 6 pages.

Nikon MicroscopyU: Interactive Jave Tutorials website, "Digital Camera Resolution Requirements for Optical Microscopy," (2000-2004), available at http://www.microscopyu.com/tutorials/java/digitalimaging/pixelcalculator, 4 pages.

The Imaging Source website, "Introduction to Optics and Lenses," (2003), available at http://www.theimagingsource.com/prod/opt/opticsintro_2.htm, 10 pages.

CDMOptics website, "Image Gallery," (2001).

Oshima, Shigeru, "Acquisition: Fundamental Optics of Television Camera Lenses," shortened version of the Fundamental Optics section in *Canon Guidebook of Television System Optics* (*Ed. 2*), (Jan. 2000), 13 pages.

Digibird.com website, "Essential Optics for Digiscoping," (2002), available at http://www.digibird.com/primardir/primer0.htm, 4 pages.

Cisco Systems, Inc., "Cisco VT Advantage Video Telephony Solution," (1992-2004), pp. 1-6.

"Nordic Guide to Video Telephony and Video Relay Service," The Nordic Forum for Telecommunication and Disability 2002, NFTH Mar. 2002, pp. 1-14.

Techno World, "Multimedia Cameras for Visual Society: Ultraminiature Multimedia Camera Systems," (undated), 6 pages.

* cited by examiner

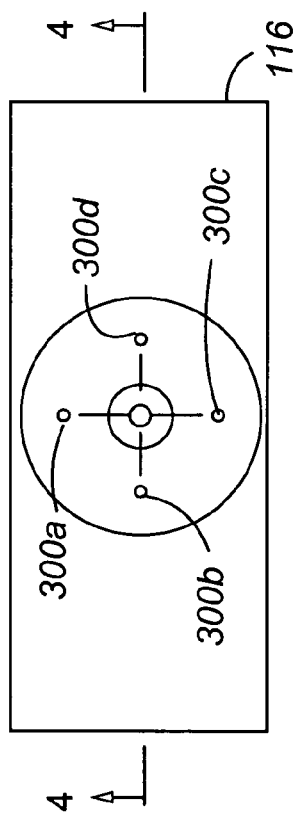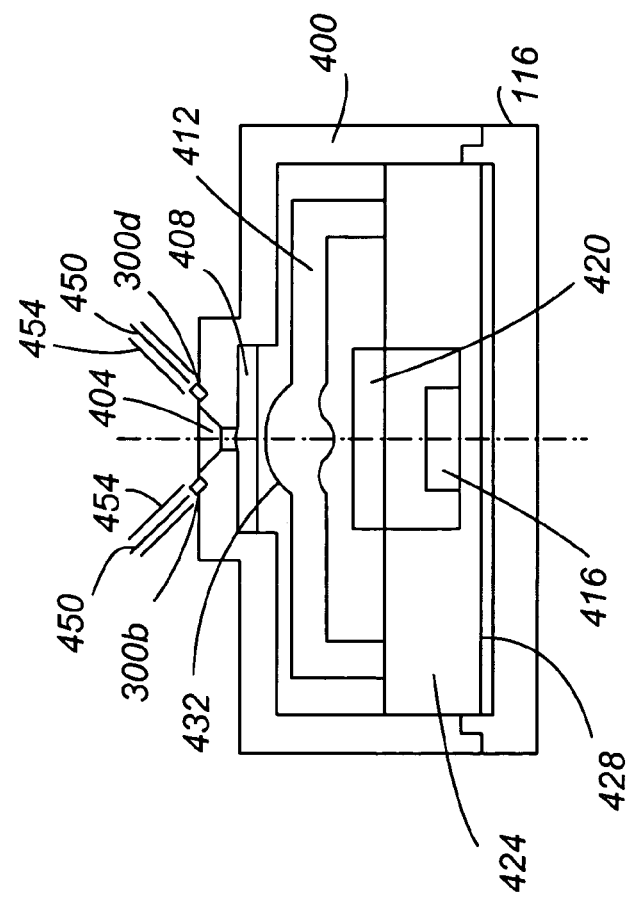

CAMERA FRAME DISPLAY

CROSS REFERENCE TO RELATED APPLICATION

Cross reference is made to U.S. patent application Ser. No. 10/941,199, filed Sep. 14, 2004, entitled "CUSTOMIZABLE BACKGROUND FOR VIDEO COMMUNICATIONS", which is incorporated herein by this reference.

FIELD OF THE INVENTION

The invention relates generally to an image acquisition system and particularly to an image acquisition that is capable of informing a user of the physical boundaries of the camera's field of view.

BACKGROUND OF THE INVENTION

The use of video telephony, which allows remote parties to both see and hear one another, is becoming increasingly popular. As used herein, "video telephony" refers to visual communication using both video and audio transmitted over a communications network. It includes both mobile and stationary video telephony. Typically, video telephony refers to packet-switched and circuit-switched, wireless and wired, audio and video communications, such as Voice Over IP or VoIP communications, and video teleconferencing. Such applications facilitate remote communication by providing a visual image of each conference participant. Accordingly, video telephony allows parties to communicate audibly and visibly, without requiring lengthy and expensive travel.

In a typical video telephony application, a camera is positioned to obtain an image of each of the video telecommunications session or interaction participants. The image of one participant is then provided to the other participant so that each participant is viewing the other participant during the session. Because the individual participants in video telephony are typically looking at a video monitor providing an image of the other participant, it is difficult for a participant during the session to comprehend the physical boundaries of the camera's field of view being captured by his or her corresponding camera. As will be appreciated, "field of view" refers to the actual size of the captured image and is proportional to the focal length of the camera's lens system. When making a video call, it is very useful to know what is being displayed to the other participant of the call (or to know what is in-shot and out-of-shot). This not only allows the participant's camera to be aimed or oriented correctly (to include the desired area(s) and/or object(s) and exclude undesired area(s) and/or object(s)) but also allows participants to avoid distracting actions "on-camera" or attempting to communicate by gestures while the gesture is off camera.

Currently, the desire of each participant to understand what the other participant is viewing during the communication session is accommodated by having a separate second monitor set up which displays the image currently being sent to the other participant, thereby allowing each participant to check in real-time what is being shown to the other participant. There are drawbacks with this approach. First, the second monitor must be easily visible. Often it is too small to be easily seen by the participant from each of the participant's desired physical positions/orientations. Second, the continual looking away of a participant from the camera to view the second monitor can be distracting to the other participant. Third, when the camera is adjusted by the participant, the participant often must awkwardly look away from the camera towards the second monitor, thereby complicating proper camera adjustment. Fourth, when the user is attempting to position entirely or partially an object within the view of the camera he or she must look at the second monitor, which complicates positioning the object. Finally, the participant must be mindful during the communication session of when they are approaching the invisible field of view boundary from either direction.

SUMMARY OF THE INVENTION

These and other needs are addressed by the various embodiments and configurations of the present invention. The present invention is directed generally to a device and method for visibly delineating the boundary of an imaging device's field of view, captured image frame, image size, and/or image circle. As will be appreciated, the "image circle" refers to the range of the image formed by the lens system.

In one embodiment, a method for conducting video telecommunications is provided that includes the steps of:

(a) an imaging device (such as a camera) receiving an image of a first participant in a communication interaction with a second participant located remotely from the first participant;

(b) an audio input receiving the first participant's voice communication with the second participant;

(c) a processor effecting transmission of the received image and voice communication to the second participant; and (d) during the communication interaction, projecting at least one boundary marker, visible to the first participant, to indicate a spatial extent of the received image and/or an image circle of the imaging device.

The boundary marker is typically a beam of light projected from a boundary marking device. A preferred boundary marking device is a laser or other type of light source. To delineate clearly the periphery of the received image frame and/or image circle, a number of marking devices are preferably positioned around the lens of the imaging device.

The boundary marking devices are reoriented as needed to account for changes in the size of the received image frame and/or image circle due for example to zooming of the lens.

The boundary markers are user configurable for brightness and also pattern or border style (e.g., dots, dashes, solid-line, or combinations of patterns with variable densities).

The boundary marking devices are preferably oriented at an angle from the viewer's eyes so that the illuminated light sources in the devices are not visible when the viewer looks directly or indirectly at the monitor (on top of which the imaging device is commonly positioned) and/or the imaging device. In this manner, the light source or boundary marking beams do not blind or otherwise interfere with the viewers eyes.

The boundary markers provide to the participant a readily visible boundary of the captured or received image. The participant is no longer required to refer awkwardly to the transmitted image in a second monitor. The boundary marker(s) is overlaid and visible directly on the scene being imaged. This means that an object crossing the boundary (either into or out of the frame) is painted with light from the boundary markers, thereby providing an immediate and readily visible reminder to the participant of the metes and bounds of the captured image. As a result, the participant can easily and quickly adjust the camera and position an object in the field of view simply by looking at the positions of the boundary markers.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 3 is a front view of the camera of the video telephony image acquisition system of FIG. 2;

FIG. 4 is a cross-sectional view of the camera along line 4—4 of FIG. 3;

DETAILED DESCRIPTION

Figure 1A:
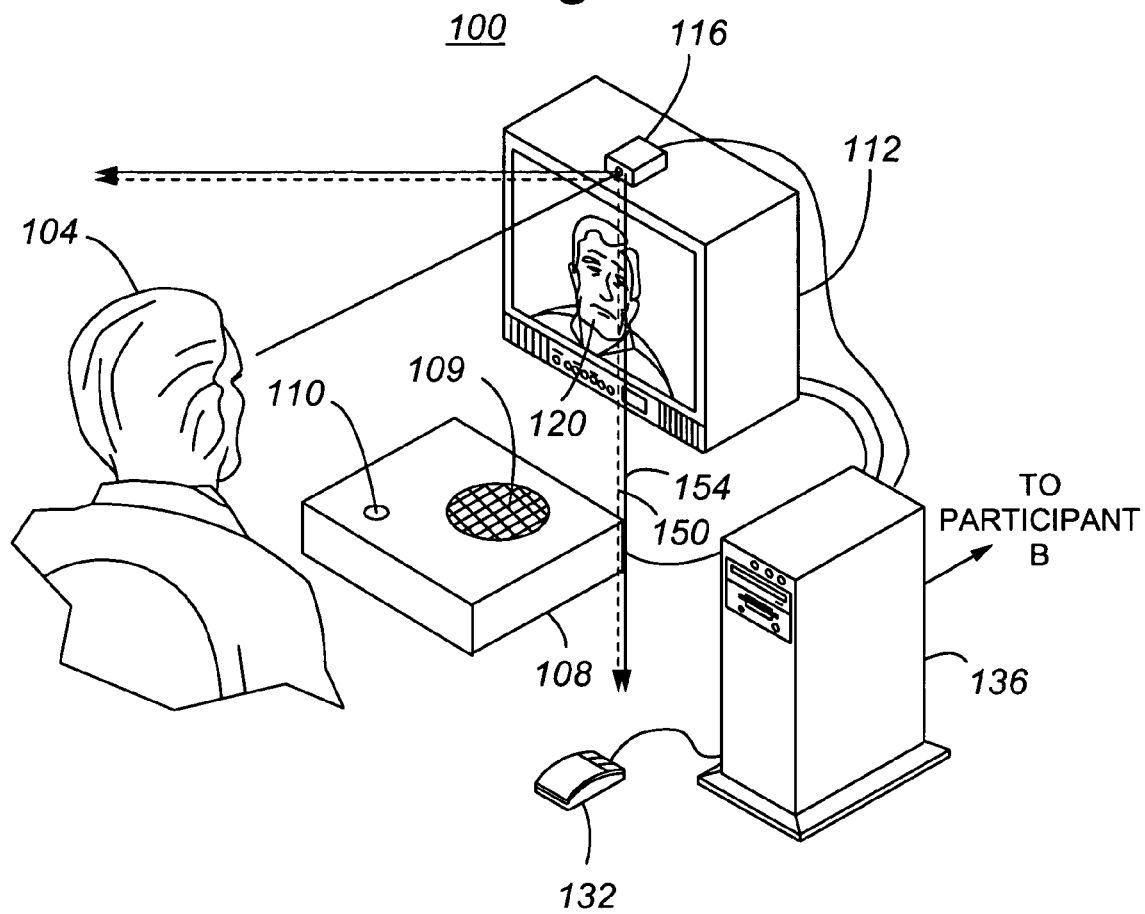
FIG. 1A depicts components of a video telephony image acquisition system in accordance with an embodiment of the present invention.

With reference to FIG. 1A, components of a video telephony image acquisition system 100 in accordance with an embodiment of the present invention are illustrated. In general, the video telephony image acquisition system 100 comprises a first participant A 104, an audio transceiver 108, which includes a speaker 109 and a microphone 110, a video display 112, and a camera 116. The video telephony image acquisition system 100 allows the first participant 104 at a first video location to communicate both audibly and visibly with a second participant at a remote second video location. In FIG. 1A, an image of the second participant B 120 is shown in the display 112.

The first participant 104 is positioned within the field of view of (and his or her image captured by) the camera 116. The dashed lines 150 represent the physical boundary of the camera's field of view. The first participant A 104 may desire to provide a specific image to the second participant. For example, the first participant A may desire to move relative to the camera to perform a desired action, such as grabbing or laying down an object, repositioning his or her body to a more comfortable position, or display a hand or body gesture to the second participant. Alternatively, the first participant A may desire to prevent the second participant B from viewing one or more selected areas and/or objects. For example, the second participant may wish to block from the second participant's display a part of the first participant's anatomy, another person in the vicinity of the first participant, an activity being performed by the first participant, or an inanimate object in the first participant's vicinity.

Figure 1B:
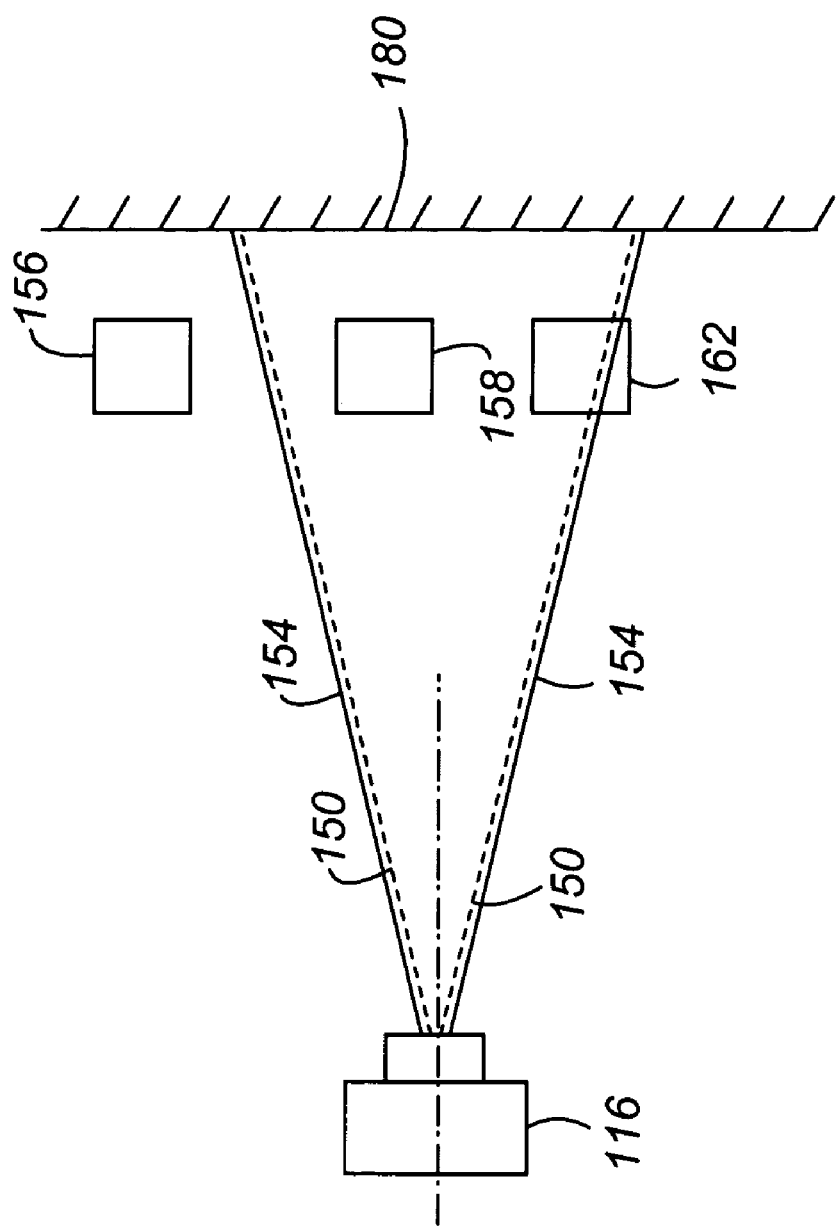
FIG. 1B depicts the frame boundary marking system according to an embodiment of the present invention.

The camera 116 includes one or more frame boundary marking devices (not shown in FIG. 1) to indicate visibly to the first participant the physical boundary of the camera's field of view 150. The marking devices are aimed along the edges of the camera's field of view and swivelled with it. The marking devices are commonly light sources. As shown by FIGS. 1A and 1B, the light beams 154 emanated by the devices provide a visible frame marking the boundary of the camera's field of view 150 or the metes and bounds of the transmitted image. For example, a first object 156 is completely outside the field of view 150 and, therefore, completely excluded from the transmitted image; a second object 158 is completely within both the field of view and captured image 150 and, therefore, completely included in the transmitted image; and a third object 162 is only partly within both the field of view and captured image 150 and, therefore, only partly in the transmitted image.

Figure 2:
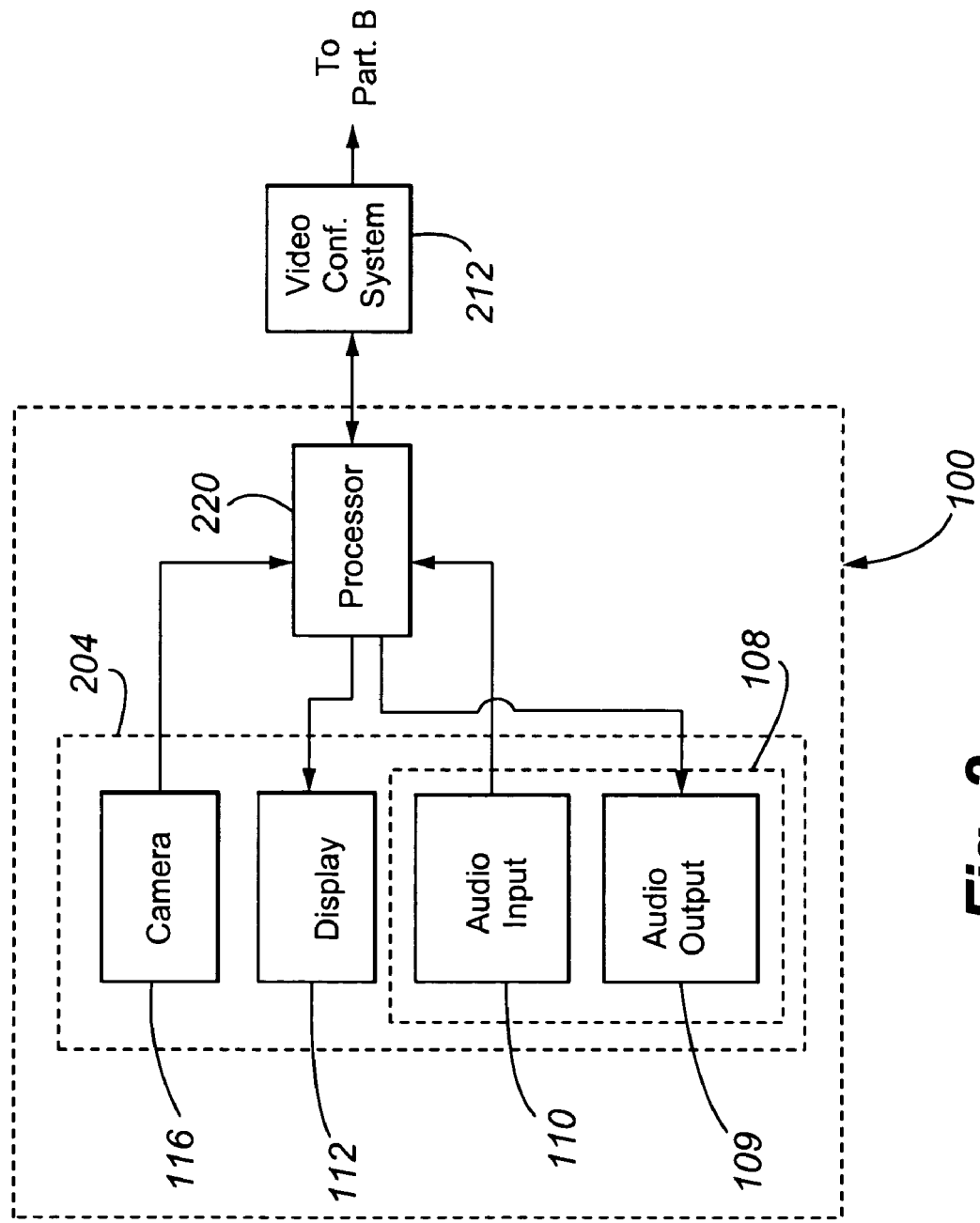
FIG. 2 is a block diagram depicting a video telephony image acquisition system in accordance with an embodiment of the present invention.

With reference now to FIG. 2, a video telephony image acquisition system 100 in accordance with an embodiment of the present invention is depicted in block diagram form. As noted above, the video telephony image acquisition system 100 generally functions in connection with at least the first and second video telecommunications session participants. As shown in FIG. 2, a video telephony image acquisition system 100 in accordance with the present invention generally includes an audio transceiver 108, and the included speaker 109 and microphone 110, a display 112, a camera 116 or other imaging device, a user selection input device 132, and a processor or controller 136. In general, the devices for interfacing with the first participant 104, such as the audio transceiver 108, the display 112, the camera 116, and the user selection input 120 are located in the proximity of the first participant (i.e. at a first video session location as shown in FIG. 1A). In addition, the first video session location may include additional cameras. The first video session location may additionally include a Personal Computer or PC 136. Alternatively, the PC 136 may be sited at a different location. Furthermore, functions of the PC 136 may be distributed among various locations interconnected to the video telephony image acquisition system 100. As will be appreciated, the PC 136 may be replaced by any type of computing system, such as a laptap.

The audio transceiver 108 provides audio output through a speaker 109 and audio input through a microphone 110. In accordance with an embodiment of the present invention, the audio transceiver 108 comprises a speaker phone having common telephony functionality. According to another embodiment of the present invention, the audio transceiver 108 comprises a speaker 109 and a microphone 110 that function as part of an IP soft phone running on a processor 136 comprising a general purpose or personal computer. In general, the audio transceiver 108 may be any device capable of translating acoustical signals into electrical signals and vice versa.

Although an IP soft phone is depicted in FIGS. 1 and 2, it is to be understood that the concepts of the present invention may be used with any wireless or wired, packet- or circuit-switched communication device, such as an IP hard phone, a video conferencing system, and other types of video telephones.

The display 112 may comprise any device capable of receiving a video signal and displaying a corresponding image. For example, the display 112 may comprise a cathode ray tube or a liquid crystal display.

The camera 116 may be any analog or digital device capable of translating images of a scene into electronic signals. For example, the camera 116 may comprise an optical lens system in combination with an image sensor, such as a charge coupled device or Complementary Metal Oxide Semiconductor or CMOS.

The user selection input device 132 may comprise various devices for receiving input from a user, such as a first video telephony participant 104. For example, the user selection input device 132 may comprise a keyboard; a pointing device, such as a mouse or track ball; or a voice recognition system operating in connection with the microphone 110. Signals from the user selection input device 132 are provided to the processor 136.

The PC 136 may, as mentioned above, be any general purpose or personal computer. In addition, the computer may include a specially adapted video telephony processor unit, for example, utilizing a specialized controller, or a general purpose processor running code specifically adapted for performing video telephony functions. For example, the PC 136 may run a video telephony software application in conjunction with a standard operating system, such as the Windows 2000™ operating system. As a further example, the processor 136 may comprise a video telephone incorporating a suitably programmed controller running firmware.

After acquiring the image obtained by the camera 116, the video telephony image acquisition system 100 may provide the image to a video conferencing system 212. The video conferencing system 212 may comprise a communication network interconnecting the video telephony image acquisition system 100 to a second video telephony image acquisition system (not shown), or to any video telephony station or device capable of displaying images for viewing by the second participant. In addition, the video conferencing system 212 may comprise protocols for the transfer of audio and video information between the video telephony image acquisition system 100 used by the first participant 104 and the input and output system used by the second participant 120. In accordance with an embodiment of the present invention, the second video conference participant 120 may view the images provided by the video telephony image acquisition system on a conventional hard video phone or a soft video phone implemented in connection with a personal computer. In accordance with a further embodiment of the present invention, the video telephony system 212 comprises the Internet, and utilizes Internet protocol type communications, such as the H.323 or Session Initiation Protocol (SIP) protocols.

The camera 116 is depicted in greater detail in FIGS. 3 and 4. The camera 116 includes a cover 400, diaphragm 404, infrared cut filter 408, a simple or compound spherical lens or lens system 412 (having a field of view, image frame, and/or frame size), Charge Coupled Device or CCD 416 for image capture (and having a size that is larger than the captured image frame or frame size), CCD cover glass 420, and a substrate 424 containing the CCD driver and other integrated circuits 428. The camera 116 includes a plurality of frame boundary marking devices 300a–d positioned at desired intervals around the periphery of the diaphragm 404 and spherical portion 432 if the lens 412. The boundary marking devices are oriented so as to provide a light beam 450 that is typically at least substantially parallel to the angle of view 454 of the camera lens 412. As will be appreciated, the angle of view is the angular range that can be focused within the prescribed image size. Typically, it is expressed as the angle from the principal point of the lens to the image plane, measured in horizontal, vertical and diagonal directions. The field of view, or the actual spatial extent of the image frame captured by the CCD (or the image within the camera image size), is located inside or interiorly of the diverging light beam(s) 450. As will be appreciated, the camera can be any other type of imaging device, such as a complementary metal oxide semiconductor (CMOS) image sensor-based device.

The frame boundary marking devices can be any source of visible light, such as a laser, fluorescent bulb, light bulb, halide, and xenon lamp, with a laser being preferred. The beam of light 904 includes collimated light. The light may be coherent or non-coherent. The wavelength distribution simply has to be visible to the human eye. Preferably, the emanated beam has a nonwhite color, such as blue and red.

Figure 5:
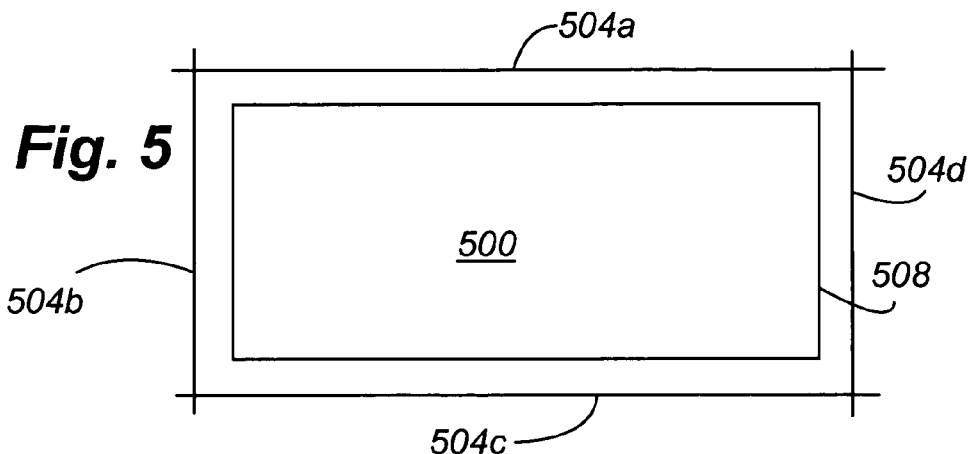
FIG. 5 depicts the field of view of the camera of FIGS. 3–4 according to a first configuration.
Figure 6:
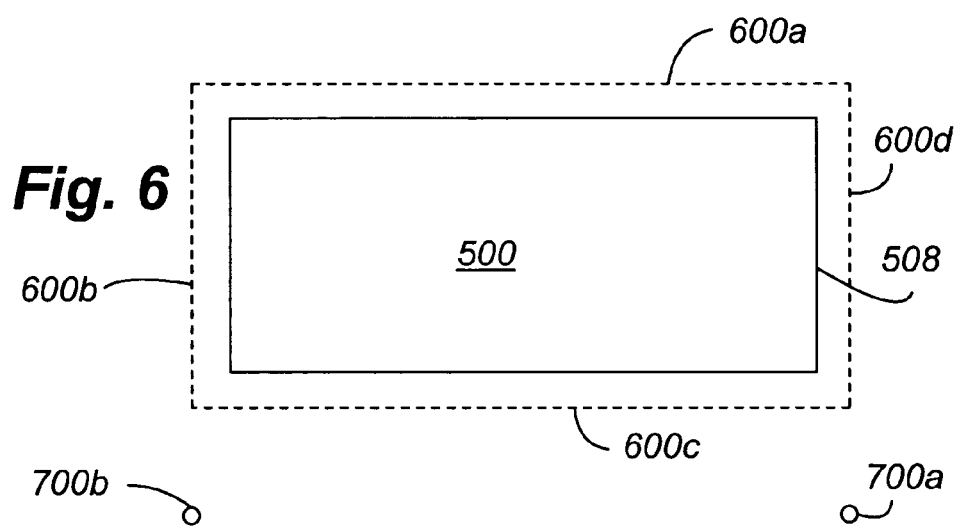
FIG. 6 depicts the field of view of the camera of FIGS. 3–4 according to a second configuration.
Figure 7:
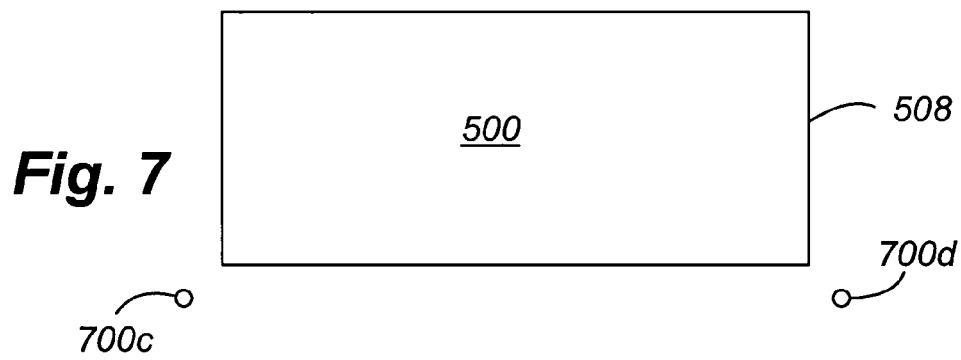
FIG. 7 depicts the field of view of the camera of FIGS. 3–4 according to a third configuration.

FIGS. 5–7 are viewed from a perspective along the optical axis (e.g., with reference to FIG. 1B, the field of view and boundary patterns are as they would appear on surface 180, which is normal to the optical axis) and exteriorly of the camera lens and depict various boundary patterns illuminated by the frame boundary marking devices. In FIG. 5, the actual spatial extent of the image captured by the camera (or camera field of view) 500 is surrounded by the illuminated continuous boundary pattern markers 504a–d, with each marker being projected by a corresponding one of the marking devices 300a–d. The markers are depicted as straight lines. As will be appreciated, the field of view as viewed along the camera's optical axis, can have a variety of patterns, such as rectangular or circular. To prevent the second participant B from viewing the markers 504a–d on his monitor (not shown), it is preferred that the markers 504a–d be positioned at or outside of the spatial limits 508 of the captured image so that they are not captured by the camera as part of the image. Referring now to FIG. 6, each of the boundary markers 600a–d is a dashed or discontinuous line. Referring now to FIG. 7, each of the boundary markers is a single point or dot 700a–d. As will be appreciated, the markers can have any shape or pattern and density depending on the application. In one configuration, the type of pattern, density, and intensity of brightness or the markers is user configurable. For example, the user can adjust the particular marker pattern, density, and brightness of each marking device separately so that each of the markers can have a different pattern, density, and/or brightness. Alternatively, the user can adjust the particular marker pattern and brightness of the marking devices as a collective group.

Figure 8:
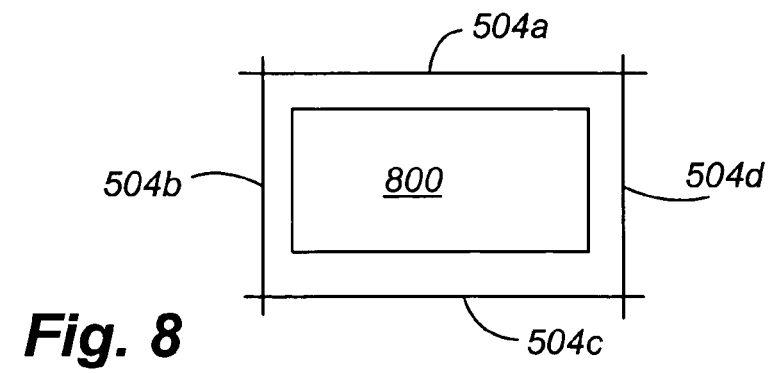
FIG. 8 shows the field of view of the camera after the zoom has been tightened.
Figure 9A:
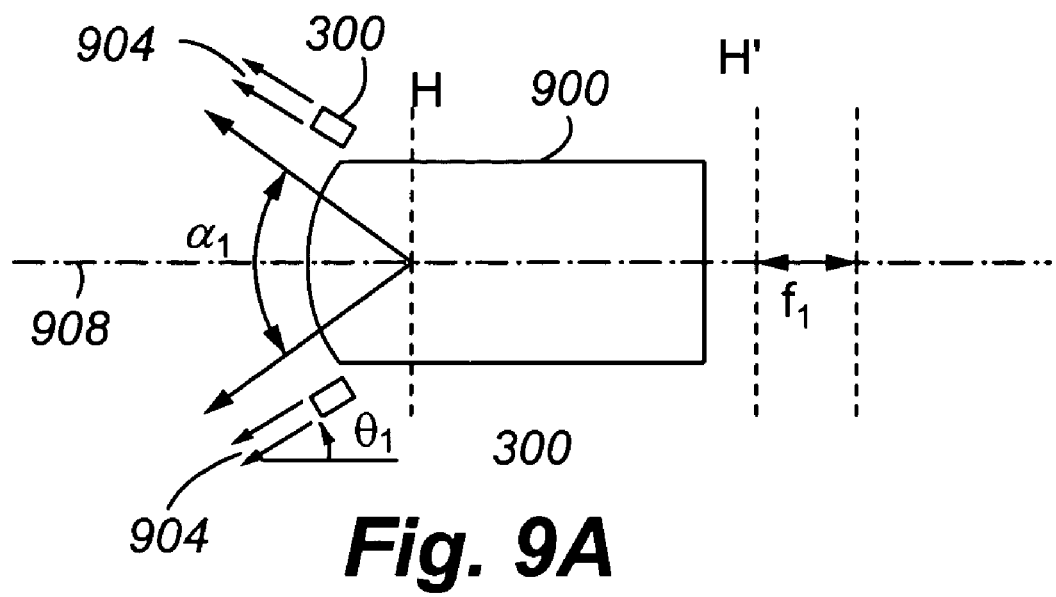
FIGS. 9A and B shows the relationship between changing the focal length of the lens and the positions and orientations of the frame boundary devices.
Figure 9B:
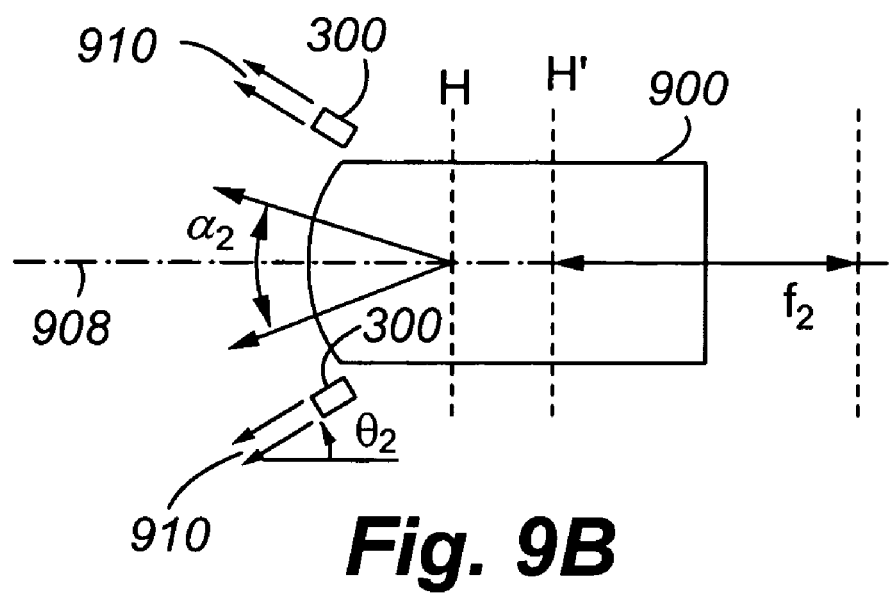

When the camera lens has an adjustable focal length and/or angle of view, such as a telephoto lens, the positions of the various marking devices can be adjusted so that their respective beams remain at least substantially parallel to the angle of view. This configuration is depicted in FIGS. 8 and 9A and B. In FIG. 9A, the lens system 900 has an optical axis 908, a first focal length $f_1$, and a first angle of view $\alpha_1$ and the beams 904 of the marking devices 300 a first angle $\theta_1$ that is typically equal to one-half the angle $\alpha_1$. As viewed from a perspective normal to the optical axis 908, the field of view 500 and boundary makers 504 would have the appearance of FIG. 5. In FIG. 9A, the lens system has a wide-angle effect. In FIG. 9B, the lens system 900 has been adjusted or zoomed to have a telephoto effect, or a longer focal length $f_2$ and a smaller angle of view $\alpha_2$. As will be appreciated, the zoom ratio is the ratio of the focal length at the telephoto end of the zoom to the focal length at the wide-angle end. As viewed from a perspective normal to the optical axis 908, the captured image 800 and boundary makers 504 would have the appearance of FIG. 8. In other words, the captured image 500 of FIG. 5 is larger than the captured image 800 of FIG. 8. As shown in FIG. 9B, the beams 910 of the marking devices 300 have a second angle $\theta_1$ that is typically equal to one-half the angle $\alpha_2$. In other words, the orientations of the devices 300 have been adjusted so that the first angle $\alpha_1$ is larger than the second angle $\theta_2$. This can be effected by numerous techniques known to those of skill in the art, such as the use of one or more repositioning gears having a gear ratio proportional to the zoom ratio.

The markers can be presented continuously or discontinuously during the communication session. In one configuration, a motion activator or detector (not shown) is coupled to and controls the operation of the marking devices 300. When no movement is detected during the communication session, the marking devices are deactivated or turned off and no boundary markers illuminated or otherwise visible. When movement is detected, the marking devices are activated or turned on and the boundary markers illuminated to visibly define and delineate the field of view boundaries. The movement may be restricted to movement across or near the boundary of the field of view and/or captured image. In other words, movement entirely within the central area of the field of view and/or captured image would not cause activation of the marking devices. Movement toward the periphery of the field of view and/or captured image and/or across a boundary would cause activation of the marking devices. Alternatively or additionally, the marking devices can be activated only when the camera is being physically moved or repositioned by the user. The marking devices can be illuminated only at periodic time intervals and for selected time periods during the communication session. Alternatively, the marking devices can be activated and boundary markers visible during the entire duration of the communication session.

A number of variations and modifications of the invention can be used. It would be possible to provide for some features of the invention without providing others.

For example in one alternative embodiment, the boundary markers delineate the spatial extent of the image circle or the range of the image. When the boundary of the image circle (rather than the rectangular spatial boundary of the field of view or captured image) is delineated, the markers form a continuous or discontinuous circular or arcuate line around at least part of the periphery of the image circle.

In another alternative embodiment, the boundary markers can be employed with imaging devices other than video telephones. Examples of such devices include as well as other types of imaging devices, such as still or video analog or digital cameras, and camcorders.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for conducting video telecommunications, comprising:
   (a) an imaging device receiving an image including a first participant in a communication interaction with a second participant located remotely from the first participant;
   (b) an audio input receiving the first participant's voice communication with the second participant;
   (c) a processor effecting transmission of the received image and voice communication to the second participant; and
   (d) during the communication interaction, at least one boundary marking device projecting at least one illuminated boundary marker to indicate a spatial extent of at least one of the received image and an image circle of the imaging device, wherein, for at least a selected portion of the boundary marker, one of the following is true:
   (d1) the illuminated boundary marker is projected onto a background surface and visible continuously to the first participant while the first participant is properly positioned within the at least one of the received image and image circle, wherein the illuminated boundary maker is outside of the spatial extent of the at least one of the received image and image circle; and
   (d2) the illuminated boundary marker is projected onto a background surface and is visible to the first participant only when a motion detector detects movement of the first participant in spatial proximity to the spatial extent of the at least one of the received image and image circle, wherein the illuminated boundary marker is outside of the spatial extent of the at least one of the received image and image circle.

2. The method of claim 1, wherein the at least one boundary marking device is a light source and the at least one boundary marker is a light beam projected by the light source and wherein the light beam is collimated.

3. The method of claim 1, wherein (d1) is true and wherein the imaging device has a field of view and the at least one boundary marker is at or near the periphery of the field of view.

4. The method of claim 1, wherein (d1) is true and wherein the at least one boundary marker is at or near the actual periphery of the received image.

5. The method of claim 1, wherein (d1) is true and wherein the imaging device has an image circle and the at least one boundary marker is at or near the actual periphery of the image circle.

6. The method of claim 1, wherein (d1) is true and wherein a plurality of boundary marking devices are positioned around a lens of the imaging device and wherein the boundary marking devices are oriented at an angle from the first participant's eyes so that a light source in each of the boundary markers is not visible when the first participant looks directly or indirectly at the imaging device.

7. The method of claim 1, wherein a plurality of boundary marking devices are positioned around at spaced intervals around a lens of the imaging device and further comprising:
increasing or decreasing a focal length of a lens of the imaging device; and
altering an angular orientation of the boundary markers, relative to an optical axis of the imaging device, in response to the increasing or decreasing step, wherein, when the focal length is increased, the angular orientation relative to the optical axis is decreased, and, when the focal length is decreased, the angular orientation relative to the optical axis is increased.

8. The method of claim 1, wherein (d2) is true and wherein at least most of the rays of the light beam are parallel to an angle of view of the imaging device.

9. The method of claim 1, wherein the at least one boundary marker surrounds, at least substantially, the at least one of the received image and an image circle of the imaging device and wherein the boundary marker has a plurality of segments, each segment having a different pattern, density, and/or brightness.

10. The method of claim 7, wherein the imaging device has an optical axis, wherein the increasing or decreasing step respectively decreases or increases an angle of view of the imaging device, and wherein an angular orientation of the at least one boundary marker relative to the optical axis is approximately one-half of the angle of view of the imaging device.

11. The method of claim 1, wherein (d2) is true.

12. The method of claim 11, wherein the projecting step occurs only when at least one of a selected type of movement and area of movement is detected.

13. A video telephony system, comprising:
(a) an imaging device operable to receive an image of a first participant in a communication interaction with a second participant remote from the first participant;
(b) an audio input device operable to receive the first participant's voice communication with the second participant; and
(c) a processor operable to forward the received image and voice communication, respectively, to a display and audio output device associated with the second participant, wherein the imaging device comprises at least one boundary marking device to project, during the communication session, at least one illuminated boundary marker, the boundary marker indicating a spatial extent of at least one of a field of view and an image circle of the imaging device, wherein, for a selected portion of the boundary marker, one of the following is true;
(i) the illuminated boundary marker is projected onto a background surface and visible continuously to the first participant while the first participant is properly positioned within the at least one of the received image and image circle, wherein the illuminated boundary maker is outside of the spatial extent of the at least one of the received image and image circle; and
(ii) the illuminated boundary marker is projected onto a background surface and is visible to the first participant only when a motion detector detects movement of the first participant in spatial proximity to the spatial extent of the at least one of the received image and image circle, wherein the illuminated boundary marker is outside of the spatial extent of the at least one of the received image and image circle.

14. The video telephony system of claim 13, wherein the boundary marker is formed by focused light and wherein the imaging device is a camera.

15. The video telephony system of claim 13, wherein (i) is true and wherein the at least one boundary marking device is a light source and the at least one boundary marker is a light beam projected by the light source.

16. The video telephony system of claim 13, wherein (i) is true and wherein the at least one boundary marker is at or near the periphery of the field of view.

17. The video telephony system of claim 13, wherein (i) is true and wherein the at least one boundary marker is at or near the periphery of the received image.

18. The video telephony system of claim 13, wherein (i) is true and wherein the imaging device has an image circle and the at least one boundary marker is at or near the periphery of the image circle.

19. The video telephony system of claim 13, wherein a plurality of boundary marking devices are positioned around a lens of the imaging device.

20. The video telephony system of claim 13, wherein the imaging device is operable, when a focal length of a lens of the imaging device is increased or decreased, to alter a spatial orientation of the at least one boundary marker in response thereto, wherein, when the focal length is increased, an angular orientation of the at least one boundary marker relative to an optical axis of the imaging device is decreased, and, when the focal length is decreased, the angular orientation of the at least one boundary marker relative to the optical axis is increased.

21. The video telephony system of claim 15, wherein (ii) is true and wherein at least most of the rays of the light beam are parallel to an angle of view of the imaging device.

22. The video telephony system of claim 13, wherein (i) is true and wherein the at least one boundary marker surrounds at least most of the at least one of the field of view and image circle of the imaging device.

23. The video telephony system of claim 20, wherein, when the focal length is increased or decreased, the camera decreases or increases, respectively, an angle of view of the imaging device and wherein an angular orientation of the at least one boundary marker relative to an optical axis of the imaging device is approximately one-half of the angle of view of the imaging device.

24. The video telephony system of claim 13, wherein (i) is true and wherein the projecting operation occurs discontinuously during the communication interaction.

25. The video telephony system of claim 24, further comprising (d) a motion detector operable to detect at least one of a selected type of movement and movement in a selected area and wherein the camera is operable to project the at least one boundary marker discontinuously when at least one of a selected type of movement and area of movement is detected.

26. A method for capturing an image, comprising:
(a) directing an imaging device towards person; and
(b) during the directing step, providing at least one boundary marker visible to the person to provide real-time feedback respecting the relative positions of the person and the field of view of the imaging device, wherein the boundary marker is a light beam positioned at or near the periphery of the imaging device's field of view, wherein one of the following is true:
(b1) the boundary marker is projected onto a background surface and visible continuously to the person while the person is properly positioned within the field of view, wherein the boundary maker is outside of the periphery of the field of view; and
(d2) the boundary marker is projected onto a background surface and is visible to the person only when a motion detector detects movement of the person at and/or near the periphery of the field of view, wherein the boundary marker is outside of the field of view.

27. The method of claim 26, wherein (b1) is true and wherein the imaging device comprises a plurality of marking devices providing a plurality of boundary markers and wherein the plurality of marking devices are spaced at selected intervals around a circumference of a lens of the imaging device.

28. The method of claim 26, wherein (b2) is true and wherein the plurality of boundary markers delineate at least most of the field of view.

29. The method of claim 27, further comprising:
at least one of increasing and decreasing a focal length of the imaging device, whereby the size of the field of view is changed; and
altering an angular orientation of each of the plurality of marking devices in response thereto, whereby the plurality of boundary markers are positioned at or near the periphery of the changed field of view, wherein, when the focal length is increased, the angular orientation relative to an optical axis of the imaging device is decreased, and, when the focal length is decreased, the angular orientation relative to the optical axis is increased.

30. The method of claim 29, wherein the increasing or decreasing step respectively decreases or increases an angle of view of the imaging device and wherein an angular orientation of each of the plurality of boundary markers relative to an optical axis of the imaging device is approximately one-half of the angle of view of the imaging device.

\* \* \* \* \*